United States Patent [19]

Stroback

[11] Patent Number: 4,922,341

[45] Date of Patent: May 1, 1990

[54] METHOD FOR SCENE-MODEL-ASSISTED REDUCTION OF IMAGE DATA FOR DIGITAL TELEVISION SIGNALS

[75] Inventor: Peter Stroback, Roehrbach, Fed. Rep. of Germany

[73] Assignee: Siemens Aktiengesellschaft, Berlin and Munich

[21] Appl. No.: 249,371

[22] Filed: Sep. 26, 1988

[30] Foreign Application Priority Data

Sep. 30, 1987 [DE]  Fed. Rep. of Germany ....... 3733021

[51] Int. Cl.$^5$ .......................................... H04N 7/137
[52] U.S. Cl. .................................... 358/136; 358/133
[58] Field of Search ....................... 358/133, 135, 136

[56] References Cited

U.S. PATENT DOCUMENTS 4,546,383  10/1985  Abramatic .......................... 358/135
4,785,349  11/1988  Keith .................................... 358/133
4,816,914   3/1989  Ericsson .............................. 358/135

*Primary Examiner*—Howard W. Britton
*Attorney, Agent, or Firm*—Hill, Van Santen, Steadman & Simpson

[57] ABSTRACT

A method for scene-model-assisted reduction of image data for digital television signals, whereby a picture signal supplied at time t is to be coded, whereby a predecessor frame from a scene already coded at time t-1 is present in an image store as a reference, and whereby the frame-to-frame information are composed of an amplification factor, of a shift factor and of an adaptatively acquired quad-tree division structure, and it is provided that, upon initialization of the system, a uniform, prescribed gray scale value or picture half-tone expressed as a defined luminance value is written into the image store of a coder at the transmitter and in the image store of a decoder at the receiver store, and are in the same way for all picture elements (pixels), and both the image store in the coder as well as the image store in the decoder are each operated with feed back to themselves in a manner such that the content of the image store in the coder and decoder can be read out in blocks of variable size, and can be amplified with a factor greater than or less than 1 of the luminance and can be written back into the image store with shifted addresses, whereby the blocks of variable size are organized according to a known quad-tree data structure.

2 Claims, 3 Drawing Sheets

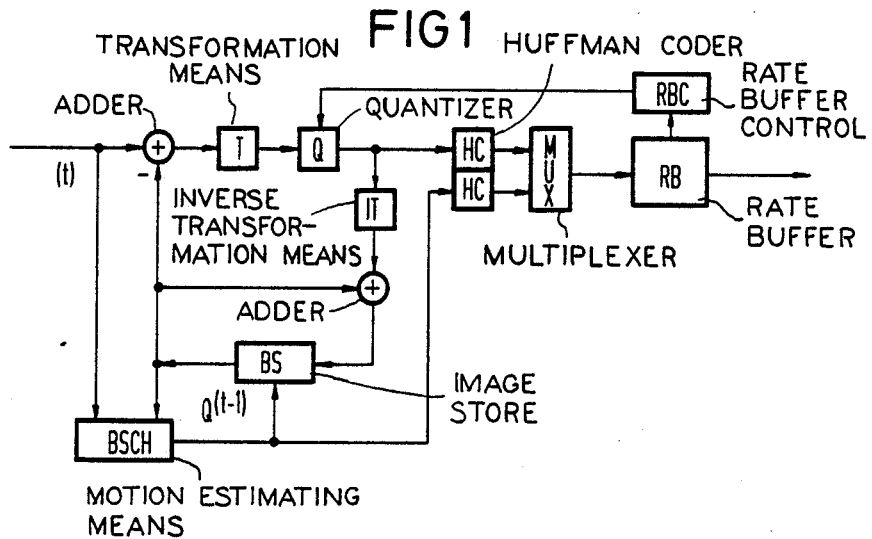
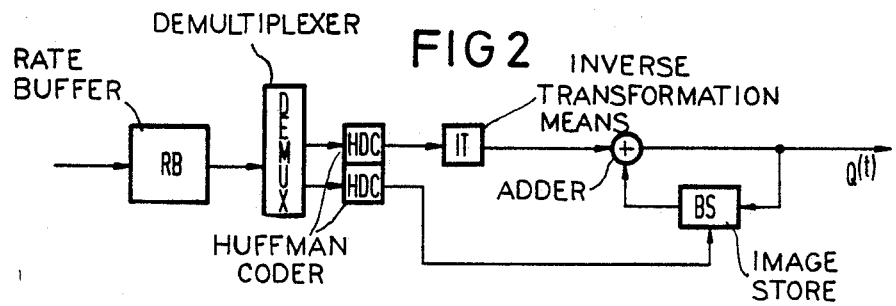

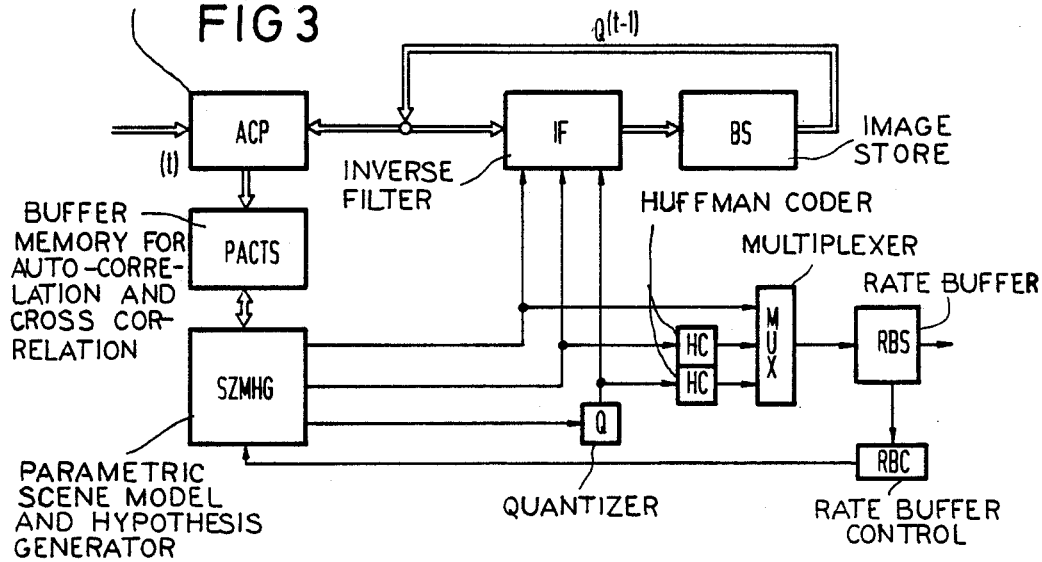
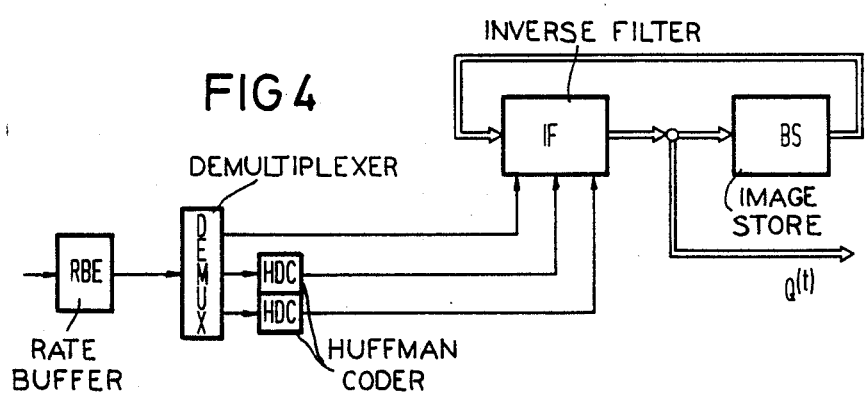

METHOD FOR SCENE-MODEL-ASSISTED REDUCTION OF IMAGE DATA FOR DIGITAL TELEVISION SIGNALS

BACKGROUND OF THE INVENTION

1. Field of the Invention

The present invention is directed to a method for scene-model-assisted reduction of image data for digital television signals, whereby a picture signal supplied at time t is to be coded, whereby a predecessor picture from a scene already coded at time t−1 is present in an image store as a reference, and in which the picture-to-picture information consists of an amplification factor, of a shift factor and of an adaptively acquired quad-tree division structure.

2. Description of the Related Art

Methods for the reduction of image data for digital television signals are known from the prior art as what are referred to as "hybrid coders" which are essentially based on two methods independent of one another which yield a hybrid coder in common, and see, for example, W. H. Chen and W. K. Pratt, "Scene Adaptive Coder", IEEE Transactions on Communications, Volume COM-32, No. 3, pages 225 thru 232, 1984; H. Hoelzlwimmer, W. Tengler and A. V. Brandt, "A New Hybrid Coding Technique for Video Conference Applications at 2 Mbit/s", Proc. SPIE Conf. on image coding, pages 250 thru 259, 1985; G. Kummerfeldt, F. May and W. Wolf, "Coding Television Signals at 320 and 64 kbit/s", Proc. SPIE Conf. on image coding, pages 119 thru 128, 1985.

These are:

1. Motion-compensated, chronological prediction

The image store is therein divided into segments (blocks) having a fixed size (typically 16×16 pixels). In terms of local position in the image store, these blocks can be shifted along the motion vectors. One thereby succceeds at least approximately in bringing moving subjects in successive frames of a scene into coincidence. The prediction error signal in the DPCM loop of the coder as shown in FIG. 1 is thereby minimized and partially decorrelated.

2. Transformation coding of the prediction error signal

The prediction error signal that has been already minimized by the motion-compensated prediction is now further decorrelated in the second step by using a transformation (typically, discrete cosine transformation-DCT, as shown in FIG. 1). In a hybrid coder, accordingly, the information to be transmitted is composed of the following components:

1. Motion vectors

Transformed and quantized error signal after motion-compensated prediction.

It can be seen in the analysis of the error signal remaining after the motion-compensated prediction that this signal is already greatly decorrelated and comprises significant Dirac-like amplitudes particularly at the luminance edges of a subject. A signal of this nature can hardly be further decorrelated by transformation. Conventional hybrid coders in fact require about 74% of the data rate available overall for the transmission of this error signal that, however, only contains about 5% of the energy of the original picture signal. This considerable outlay for data rate could only be justified if the error signal would in fact involve significant information for the purpose of obtaining a good, subjective picture quality. This, however, is obviously not the case for the error signal has significant amplitudes only at pronounced luminance edges and the human eye already greatly "masks" errors precisely at the luminance edges (ie, they are hardly perceived). In this regard, also see the psycho-optical test results in the publication by P. Pirsch, "Quellencodierung von Bildsignalen", NTZ, Volume 37, No. 1, pages 33–34 and No. 2, pages 105 thru 106, 1984. Tests have in fact shown that, after successful motion compensation, the error signal can be completely omitted in the reconstruction in the receiver without a perceptible falsification of the reconstructed frame occurring. Since hybrid coders, however, are based on a DPCM in the chronological direction, the transmission of the error signal is absolutely necessary in order to preserve a stable operation, regardless of whether the error signal contributes to an improvement of the subjective picture quality in the receiver or not. In order to observe the prescribed channel rate, it is also necessary to roughly quantize or completely omit spectral components (DCT coefficients) of the error signal. Relative to a good subjective image quality, these measures usually have more serious consequences than the omission of the entire error signal, for the reconstruction of the error signal from an incomplete set of coefficients usually leads to a signal that unfavorably comprises significant amplitudes at locations in the frame as where no luminance edges occur but uniform areas are situated. These disturbances can then be clearly perceived by the human eye and represent a considerable deterioration of the subjective picture quality. Based on this analysis, one arrives at the conclusion that conventional hybrid coders are more likely to effect a deterioration of the subjective picture quality due to the error signal transmitted with a high percentage of the available data rate and are free of the high-frequency components.

SUMMARY OF THE INVENTION

The present invention is based on the object of providing a method which eliminates the afore-mentioned deficiencies of prior art known methods for the reduction of image data in a reliable way.

It is an object of the present invention to provide a method for scene-model-assisted reduction of image data for digital television signals whereby a picture signal applied at time t is to be coded whereby a predecessor picture from a scene already coded at time t−1 is present in an image store and whereby the frame to frame information is composed of an amplification factor, a shift factor and an adaptively acquired quad-tree division structure wherein a uniformly prescribed gray scale value or picture half-tone expressed as a defined luminance value is written into the image store of a coder at the transmitting site and into the image store of a decoder at the receiving site and are written into the store in the same manner. In other words, with overall picture elements of pixels, both the image store in the coder as well as the image store in the decoder are each operated and fed back to themselves in a manner such that the contents of the image store in the coder and the decoder can be read out in blocks of variable sizes and the luminance can be amplified with a factor greater than or less than 1 and can be written back into the image stores addressed in a shifted fashion such that the blocks of variable size are organized according to a known quad-tree data structure.

Other objects features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 shows the block circuit diagram of a traditional hybrid coder having motion-compensated, chronological prediction and transformation coding of the error signal for the transmitting side of a transmission system;

FIG. 2 shows the block circuit diagram of a traditional hybrid coder for the receiving side of the transmission system;

FIG. 3 shows a subject-oriented scene coder (transmitter) of the present invention;

FIG. 4 shows a subject-oriented scene coder (receiver) of the present invention.

DESCRIPTION OF THE PREFERRED EMBODIMENTS

Figure 5:
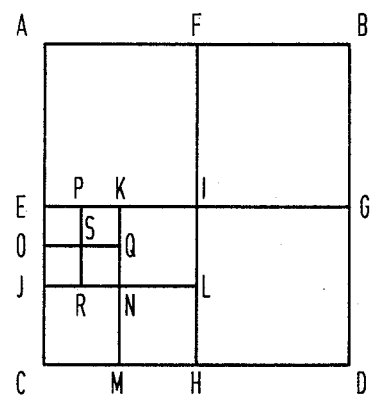
FIG. 5—shows what is referred to as a quad-tree structure for adaptive, hier-archic division of a frame into blocks of variable size.

The invention is based on the perception that chronologically successive frames of a scene are very "similar". Changes in successive frames are either the consequence of a true innovation, ie. new scene contents are built up, or the consequence of the movement of subjects in the scene that are already known. As a foundation for the information processing of scenes, thus, it is required that to have an appropriate scene model that is in the position to efficiently describe the afore-mentioned elementary events "innovation" and "motion". A suitable scene model has already been proposed. Thus, the elementary events "innovation" and "motion" can be described by a scene model that constructs a picture from its predecessor picture by amplification of individual sub-regions as well as by subsequent shifting of these sub-regions along previously estimated motion vectors. Changes in the scene are thus modeled by the set of parameters composed of a "gain or amplification factor" and a "shift factor". It is thus critical to note that the set of parameters is estimated using the minimization of a central error criterion. As a result, the two parameters of "gain factor" and "shift vector" act in orthogonal optimization directions in every instance and achieve an optimum result in every instance in an efficient data reduction. It is then also critical to identify the stationary regions in the current scene frame that can then be described by a common set of parameters. In the new, scene adaptive coder, this occurs on the basis of a quad-tree structure, as shown in F. T. Y. Young and K. S. Fu, Handbook of Pattern Recognition and Image Processing, Academic, 1986, and is also shown in FIG. 5. The erection of the quad-tree occurs in a hier-archic fashion on the basis of the decision between two hypotheses:

The first hypothesis: Four neighboring blocks having a size of $n \times n$ pixels have identical parameters (gain, shift) and, accordingly, can be combined to form a super-ordinated block having a size of $2n \times 2n$ pixels.

The second hypothesis: Four neighboring blocks having a size of $n \times n$ pixels each have different sets of parameters and must therefore be differently treated.

This hier-archic procedure in the combination of stationary sub-regions makes it possible to ultimately combine sub-regions up to the size $n \times n = 32 \times 32$, beginning, for instance, at the block size $n \times n = 2 \times 2$. An extremely high data compression can thereby achieved. The fine resolution in non-stationary regions (edges of moving subjects) that is required is nonetheless fully preserved since the method decides there in favor of hypothesis two (do not combine neighboring blocks). The method thus operates content-oriented. The underlying, content-dependent division structure (quad-tree) must thus be co-transmitted to the receiver. Recent investigations have shown that the coding and transmission of the quad-tree only uses about 20% of the overall data rate of 64 kbit/sec available. FIG. 3 illustrates the block circuit diagram of a new content-oriented coder of the invention. A total of three different information must be transmitted:

1. quad-tree (about 20% of the overall rate)
2. gain factors (about 40% of the overall rate)
3. motion factors (about 40% of the overall rate).

The transmission of a prediction error signal is eliminated. Disturbing artifacts can thus no longer occur in uniform regions of the frame. The receiver of the invention is shown in FIG. 4 and comprises a simple structure. The computational cost that is required for the reconstruction of the frame in the receiver amounts to only one multiplication per pixel.

FUNCTIONING OF THE NEW METHOD

A picture detail having a size of $L \times L$ pixels is considered in a frame at point in time t, whereby the block size can be varied in powers of two: $L = 2, 3, 6, 16, 32$.

Figure 6:
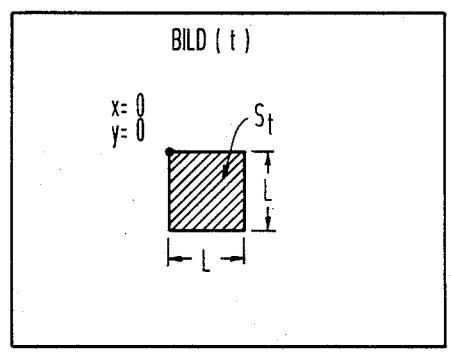
FIG. 6 is a schematic illustration of the full frame at time t with appertaining picture detail $s_d$ having the dimension $L^2$.

Let the position of the picture detail be defined by the pixel address of the upper, left-hand pixel in the picture detail. For reasons of simpler notation, this address that is variable per se is defined below as $(x=0, y=0)$. Let the pixels within the picture detail be combined in the pixel matrix $S_t$:

$$S_t = \begin{bmatrix} s_t(0,0) & s_t(=0,1) & \ldots & s_t(0,L-1) \\ s_t(1,0) & s_t(1,1) & & . \\ . & & & . \\ . & & & . \\ . & & & . \\ s_t(L-1,0) & \ldots & \ldots & s_t(L-1,L-1) \end{bmatrix} \quad (2)$$

as shown in FIG. 6.

Analogously, a picture detail is defined in the frame lying one time clock in the past. This however, being capable of being additionally shifted by i-positions in the x-direction and by j-positions in the y-direction:

$$S_{t-1}(i,j) = \begin{bmatrix} s_{t-1}(i,j) & s_{t-1}(i,j+1) & \ldots & s_{t-1}(i,j+L-1) \\ s_{t-1}(i+1,j) & s_{t-1}(i+1,j+1) & & . \\ & & & . \\ s_{t-1}(i+L-1,j) & \ldots & \ldots & s_{t-1}(i+L-1,j+L-1) \end{bmatrix} \quad (3)$$

The following quantities are subsequently defined:
m shift region: $-m \leq i,j \leq m$
g slope factor: $0 \leq g \leq 0.1$
$s_u$ lower threshold for hypothesis decision stage
$s_o$ upper threshold for the hypothesis decision stage
$C_t^{(k)}(i,j)$ Cross-correlation function for picture detail at point in time t correlated with the picture detail at time t−1 that is shifted by i-pixel positions in x-direction and by j-positions in the y-direction.

Figure 7:
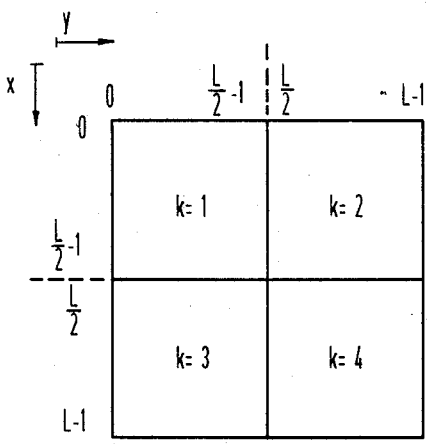
FIG. 7 is a schematic illustration of the subdivision of a picture detail having a size of $L \times L$ pixels into four sub-picture details having the size $L/2 \times L/2$ pixels.

$C_t^{(k)}(i,J)$ Cross-correlation functions of the sub-picture details k, k=1, 2, 3, 4, as shown in FIG. 7.

$A_{t-1}(i,j)$ Signal energy of the picture detail at point in time t−1.

$A_{t-1}(i,j)$ Signal energies of the sub-picture details k, k=1, 2, 3, 4, at time t−1.

$E_t$ Prediction error energy for picture detail
$E_t^{(k)}$ Prediction error energies for sub-picture details. k, k=1, 2, 3, 4.

$\rho(i,j)$ Optimization function for picture detail.
$\rho^{(k)}(i,j)$ Optimization functions for sub-picture details. k−1, 2, 3, 4.

$\tilde{\rho}(i,j)$ Cost function for optimization functions.
$\nu=[i_{opt}, j_{opt}]^T$ Motion vector estimated from picture detail.

$\nu^{(k)}=[i_{opt}^{(k)}, j_{opt}^{(k)}]^T$ Motion vectors estimated from sub-picture details.

$a(i_{opt}, j_{opt})$ Gain factor estimated from picture detail.
$a^{(k)}(i_{opt}^{(k)}, j_{opt}^{(k)})$ Gain factors estimated from sub-picture details.

Whereby:

$$C_t(i,j) = \sum_{x=0}^{L-1} \sum_{y=0}^{L-1} s_t(x,y) s_{t-1}(x+i, y+j) \quad (4)$$

$$A_{t-1}(i,j) = \sum_{x=0}^{L-1} \sum_{y=0}^{L-1} s_{t-1}^2(x+i, y+j) \quad (5)$$

$$C_t^{(k)}(i,j) = \sum_{x=\alpha}^{\beta} \sum_{y=\gamma}^{\delta} s_t(x,y) s_{t-1}(x+i, y+j) \quad (6)$$

$$A_{t-1}^{(k)}(i,j) = \sum_{x=\alpha}^{\beta} \sum_{y=\gamma}^{\delta} s_{t-1}^2(x+i, y+j) \quad (7)$$

with $-m \leq i,j \leq m$.

The following recites sub-picture details and the appertaining summation boundaries, also see FIG. 7:

| k | α | β | γ | δ |
|---|---|---|---|---|
| 1 | 0 | (L/2)-1 | 0 | (L/2)-1 |
| 2 | 0 | (L/2)-1 | L/2 | L-1 |
| 3 | L/2 | L-1 | 0 | (L/2)-1 |
| 4 | L/2 | L-1 | L/2 | L-1 |

Also valid are:

$$\rho(i,j) = \frac{C_t(i,j) C_t(i,j)}{A_{t-1}(i,j)} \quad (8)$$

-continued $$\rho^{(k)}(i,j) = \frac{C_t^{(k)}(i,j) C_t^{(k)}(i,j)}{A_{t-1}^{(k)}(i,j)} \quad (9)$$

$$\phi(i,j) = 1 - g\sqrt{i^2 + j^2} \quad (10)$$

Algorithm for estimating the motion vector for picture detail

AMAX=0
FOR i=−m, −m+1, ... m−1, m do the following:

```
FOR j = −m, −m + 1, ..., m − 1, m do the following:
    RRHO = ρ(i,j)*ζ(i,j)
    IF(RRHO > AMAX)THEN
        AMAX = RRHO
        i_opt = i
        j_opt = j
    ENDIF
```

Algorithm for estimating the motion vectors of the four sub-image details

FOR k=1, 2, 3, 4 do the following:

```
AMAX = 0
FOR j = −m, −m + 1, ..., m − 1, m do the following:
    FOR j = −m, −m + 1, ..., m − 1, m do the following:
        RRHO = ρ^(k)(i,j)*ζ(i,j)
        IF(RRHO > AMAX)THEN
            AMAX = RRHO
            i_opt = i
            j_opt = j
        ENDIF
```

Calculation of the gain factor for the picture detail $$\begin{aligned} a(i_{opt}, j_{opt}) &= C_t(i_{opt}, j_{opt}) / A_{t-1}(i_{opt}, j_{opt}) \\ &= \rho(i_{opt}, j_{opt}) / C_t(i_{opt}, j_{opt}) \end{aligned} \quad (11)$$

Calculation of the gain factors for sub-picture details $$a^{(k)}(i^{(k)}_{opt}, j^{(k)}_{opt}) = C^{(k)}_t(i^{(k)}_{opt}, j^{(k)}_{opt}) / A^{(k)}_{t-1}(i^{(k)}_{opt}, j^{(k)}_{opt}) \quad (12)$$

$$= \rho^{(k)}(i^{(k)}_{opt}, j^{(k)}_{opt}) / C^{(k)}_t(i^{(k)}_{opt}, j^{(k)}_{opt})$$

Calculation of the prediction error energy for picture detail $$E_t = \sum_{x=0}^{L-1} \sum_{y=0}^{L-1} [s_t(x,y) - a(i_{opt}, j_{opt})s_{t-1}(x + i_{opt}, y + j_{opt})]^2 \quad (13)$$

Calculation of the prediction error energies for sub-picture details $$E_t^{(k)} = \sum_{x=\alpha}^{\beta} \sum_{y=\gamma}^{\delta} [s_t(x,y) - a^{(k)}(i^{(k)}_{opt}, j^{(k)}_{opt})s_{t-1}(x + i^{(k)}_{opt}, y + j^{(k)}_{opt})]^2 \quad (14)$$

The calculations (4 thru 14) are made in the modules of the scene coder shown in FIG. 3 of the invention in the following way:

1. Auto-correlation and Cross-correlation Processor (ACP)

This processor calculates the quantities:
$C_t(i,j)$ according to rule (4)
$A_{t-1}^{(i,j)}$ according to rule (5)
$C_t^{(k)}(i,j)$ according to rule (6)
$A_{t-1}^{(k)}(i,j)$ according to rule (7).

2. Buffer Memory for Auto-correlation and Cross-correlation (PACTS)

The results of the calculations of the ACP are deposited in PACTS for a picture detail and are supplied for further processing in the module SZMHG (as follows).

3. Parametric Scene Model and Hypothesis Generator (SZMHG)

The model SZMHG first calculates the optimization factor according to Rule (8), as well as the four, separate optimization factors according to Rule (9), and, subsequently, the appertaining motion vector v according to algorithm (A1) as well as the motion vectors $v^{(k)}$ according to algorithm (A2).

Finally, the calculation of the gain factor for the picture detail is carried out according to Rule (11) and the calculation of the four gain factors for the four sub-picture details as shown in FIG. 7 are carried out according to Rule (12).

A check is made in the next method step to see whether it is "better" to continue with the four separate sub-picture details (see FIG. 1) to which separate motion vectors and separate gain factors are likewise allocated (Hypothesis 1) or whether it is nonetheless possible to combine the four sub-picture details in one picture detail with appertaining, common motion vector and common gain factor (Hypothesis 2).

In order to prepare the decision for one of the two hypotheses, the error energy for the entire picture detail is first calculated according to Rule (13). Following that, the four, separate error energies for the sub-picture details are calculated according to Rule (14).

The decision is in favor of Hypothesis 1 (separate further-handling of the four sub-picture details) when the following, two conditions are met:

$$ti \ (1/L^2)E_t > s_o \quad (b1)$$

$$\sum_{k=1}^{4} E_t^{(k)} < s_u E_t \quad (b2)$$

When one of the two conditions (b1) or (b2) is not met, then the method decides in favor of Hypothesis 2.

After a whole frame or a larger picture detail has been processed in the described way with the block size L, the block size L can be subsequently doubled and the method can be repeated (recursive combining). The method can be hierarchically continued up to any desired arbitrary block sizes. The combined regions are quadratic blocks of different sizes that can be described by a quad-tree. Existing for each of these blocks as the result of the method is a set of parameters composed of a motion vector and of a gain factor that is valid for all pixels within the block. The variable block size allows the method to optimally model spatial in non-stationary regions in the scene (for example, edges of moving subjects) and to also achieve an extremely high data compression in stationary regions. The information to be transmitted is ultimately composed of:
1. "Quadtree"
2. Motion Vectors"
3. "Gain Factors", which, as shown in FIG. 3, is Huffman-coded and transmitted to the receiver. These three information contain the complete description of the scene.

4. Rate Buffer (RB) and Rate Buffer Control (RBC)

Dependent on the degree of the filling of the RB, the module RBC generates an adaptive threshold $s_o$ in such fashion that $s_o$ is raised given a high filling degree of the RB, so that the method generates a block subdivision that is less fine and, thus, generates a lower, primary data rate.

5. Inverse Filter (IF) and Image Store (BS)

The image store (BS) is fed back onto itself via an inverse filter (IF). From the supplied quad-tree code, the IF takes the subdivision into blocks of different size valid for a frame or for a sub-region of a frame. Finally, each of these blocks is shifted in accord with the motion vector that is likewise transmitted and is amplified in accord with the transmitted gain factor and, finally, is written back into the image store. This occurs in such a fashion that the same shift and gain is applied to all pixels of the block according to Rule (13) for Hypothesis 1 or according to Rule (14) for Hypothesis 2.

The initial condition at the start of the coder and decoder is the uniform gray scale value "128" in the image store.

As shown in FIG. 1, the prior art device has an input signal that goes to an adder and also goes to a motion estimating algorithm BSCH. An image store BS supplies an input to the motion estimating algorithm BSCH and also to the adder and also to a second adder which supplies an input to the image store. The second adder receives an input from an inverse transformation IT which in turn receives the error signal from the quantizer which sees an input from a transformation unit T which receives an input from the first adder. A pair of Huffman coders HC respectively, receive the error signal from the quantizer Q and also receives the output of the motion estimating algorithm BSCH. The motion estimating algorithm also supplies an input to the image store as shown. The output of the Huffman coders are multiplexed together and supplied to a rate buffer RB which supplies an output channel signal and also supplies an output to a rate buffer control which supplies an input to the quantisizer Q. FIG. 2 illustrates the standard receiver wherein the channel signal is supplied to a rate buffer which supplies an output to a demultiplexer which provides two outputs that, respectively, go to Huffman decoders. The first Huffman decoder supplies an output to an inverse transformation unit IT which supplies an output to an adder. The second Huffman decoder produces the motion vectors which are supplied to an image store BS which also supplies an input to the adder. The image store receives the output of the adder which is the output signal.

FIG. 3 illustrates the transmitter of the invention wherein the signal image is supplied to an auto correlation and cross-correlation processor ACP which supplies an output to a buffer memory for auto correlation and cross-correlation PACTS. A parametric scene model and hypothesis generator SZMHG communicates with the buffer memory PACTS and produces on a first output line a quad-tree signal which is supplied to an inverse filter IF and to a multiplexer MUX. The parametric scene model and hypothesis generator also produces shift vectors which are supplied to the inverse filter and to a first Huffman coder. The parametric scene model and hypothesis generator also produces an amplification signal which is supplied to a quantizer Q which supplies an output to the inverse filter IF and also to a second Huffman coder. The inverse filter IF supplies an output to the image store BS which supplies an output to the input of the inverse filter IF as shown. The multiplexer MUX supplies an output to the rate buffer RBS which supplies an output channel signal and also supplies an output to a rate buffer RBC which supplies an input to the parametric scene module and hypothesis generator.

The receiver of the invention includes a rate buffer RB which receives the incoming channel signal and supplies an output to the demultiplexer DEMUX. The output of the demultiplexer supplies a first output which is the quad-tree signal to an inverse filter IF and the demultiplexer also supplies two separate inputs to two Huffman decoders HDC. The first Huffman decoder reproduces a shift vector which is supplied to the inverse filter IF and the second Huffman decoder produces an amplification factor which is supplied to the inverse filter IF. The inverse filter IF supplies an output to an image store BS and also produces the output signal of the image. The image store BS provides an input to the inverse filter as shown.

Although the invention has been described with respect to preferred embodiments, it is not to be so limited as changes and modifications can be made therein which are within the full intended scope as shown by the appended claims.

I claim as my invention:

1. A method for scene-model-assisted reduction of image data for digital television signals, whereby a picture signal supplied at time t is to be coded, whereby a predecessor picture from a scene already coded at time t−1 is present in an image store, and whereby the frame-to-frame information is composed of an amplification factor, a shift factor and an adaptively acquired quad-tree division structure, comprising the steps of, writing in the same manner upon initialization of the system, a uniformly prescribed gray scale value or picture half-tone expressed as a defined luminance value into the image store of a coder at a transmitter and into the image store of a decoder at a receiver, for all picture elements (pixels); and reading out of the coder and decoder the contents of the image store in blocks of variable size, and both the image store in the coder and the image storer in the decoder are each operated with feed back, amplifying the luminance with a factor greater than or less than 1 and writing it back into the image store and addressing it in a shifted manner, and organizing the blocks of variable size according to a known quad-tree data structure.

2. A method according to claim 1, comprising the steps of approximating by amplification the picture at time t from the reference frame present in the image sotre with an amplification factor greater than or less than 1 of the luminance and shifting the addres of blocks of variable size in the image store, wherein said blocks are described by a quad-tree data structure, varying and combining the size of the blocks such that, starting from sub-blocks (1, 2, 3, 4) having a smallest, prescribed block size n×m within a basic block, respectively four such sub-blocks (1, 2, 3, 4) to form a super-block having a size of 2m×2n, combining said super-blocks (1, 2, 3, 4) as required in the same manner to form a further super-block, adapting in the subdivision structure of the blocks obtained to the structure of the frame-to-frame information innovation which is to be coded, and combining the four sub-blocks (1, 2, 3, 4) to form a super-block when the conditions $$(1/L^2) E_t > s_0$$

$$\sum_{K=1}^{4} E_t^{(K)} < s_u E_t$$

are met, whereby $S_o$ is an upper threshold and $S_u$ is a lower threshold for an hypothesis decision stage, and where $E_t$ is the prediction error energy in the super-block and $E_t^{(k)}$, $k=1, 2, 3, 4$ are the prediction error energies in the four sub-blocks that are established by the relationships of the equations:

$$E_t \sum_{x=0}^{L-1} \sum_{y=0}^{L-1} [s_t(x,y) - a(i_{opt}, j_{opt})s_{t-1}(x + i_{opt}, y + j_{opt})]^2$$

$$E_t^{(k)} = \sum_{x=\alpha}^{\beta} \sum_{y=\gamma}^{\delta} [s_t(x,y) - a^{(k)}(i_{opt}^{(k)}, j_{opt}^{(k)})s_{t-1}(x + i_{opt}^{(k)}, y + j_{opt}^{(k)})]^2$$

where $S_t$ is the picture signal at time t and $S_{t-1}$ is the picture signal at time t−1 and where $i_{opt}$ and $j_{opt}$ are the optimum shift of the picture signal in the image store for the super-block and $i_{opt}$ and $j_{opt}$ are the optimum shifts of the picture signal in the image store for the four sub-blocks k−1, 2, 3, 4 and where $a(i_{opt}, j_{opt})$ is the gain factor for the super-block applied to the picture signal in the image store, where L*L indicates the dimensions of the super-block and where $a^{(k)}(i_{opt}, j_{opt})$ is the optimum gain factors in the sub-blocks $k=1, 2, 3, 4$ applied to the picture signal in the image store, where δ represents the summation boundaries for the sub-blocks that are defined in the following manner

| k | α | β | γ | δ |
|---|---|---|---|---|
| 1 | 0 | (L/2)-1 | 0 | (L/2)-1 |
| 2 | 0 | (L/2)-1 | L/2 | L-1 |

-continued

| k | α | β | γ | δ |
|---|---|---|---|---|
| 3 | L/2 | L-1 | 0 | (L/2)-1 |
| 4 | L/2 | L-1 | L/2 | L-1 | whereby the optimum shift $i_{opt}$, $j_{opt}$ for the super-block is calculated according to the method execution

AMAX=0 for $i = -m, -m+1, \ldots m-1, m$ do, the following:

```
for j = -m, -m + 1, ... m - 1, m do, the following:
    RRHO = ρ(i,j) *φ(i,j)
    IF(RRHO > AMAX) THEN
        AMAX = RRHO
        i_opt = i
        j_opt = j
    ENDIF
``` and where the optimum shifts $i_{opt}$ and $j_{opt}$ in the four sub-blocks $k = 1, 2, 3, 4$ are calculated according to the method execution FOR K=1, 2, 3, 4 for the following

AMAX=0

```
FOR i = m, -m + 1 ..., m - 1 m, do the following
    FOR j = m, -m + 1 ..., m - 1 m, do the following
        RRHO ρ^(k)(i,j) * φ(i,j)
        IF(RRHO > AMAX) THEN
            AMAX = RRHO
            i_opt = i
            j_opt = j
        ENDIF
``` where the quantity $\rho = (i,j)$ to be maximized for the super-blocks is defined according to the relationship $$\rho(i,j) = \frac{C_t(i,j) \, C_t(i,j)}{A_{t-1}(i,j)}$$

and the quantities $\rho^{(k)}(i,j)$, $k = 1, 2, 3, 4$ are defined according to the relationship $$\rho^{(k)}(i,j) = \frac{C_t^{(k)}(i,j) \, C_t^{(k)}(i,j)}{A_{t-1}^{(k)}(i,j)}$$

and where $\rho(i,j)$ represents a multiplicative, cost function having the form $$\rho(i,j) = 1 - g\sqrt{i^2 + j^2}$$

where g is a positive, real number and i and j are the current shift and whereby the quantity $C_t(i,j)$ are the cross-correlation function between the picture signal at time t and the picture signal in the image store in the super-block is calculated according to the relationship $$C_t(i,j) = \sum_{y=0}^{L-1} \sum_{y=0}^{L-1} s_t(x,y) \, s_{t-1}(x + i, y + j)$$

and where the quantities $C_t^{(k)}(i,j)$, $k = 1, 2, 3, 4$ are the analogous cross-correlation functions in the sub-blocks $k = 1, 2, 3, 4$ are are defined as $$C_t^{(k)}(i,j) = \sum_{x=\alpha}^{\beta} \sum_{y=\gamma}^{\delta} s_t(x,y) \, s_{t-1}(x - i, y - j)$$

and where the quantity $A_{t-1}(i,j)$ is the energy of the signal in the image store for the super-block corresponding to the definition $$A_{t-1}(i,j) = \sum_{x=0}^{L-1} \sum_{y=0}^{L-1} s_{t-1}^2(x + i, y + j)$$

and the quantities $A^{(k)}_{t-1}(i,j)$, $k = 1, 2, 3, 4$ are the energies of the signal in the image store for the four sub-blocks $k = 1, 2, 3, 4$ according to the definition $$A_{t-1}^{(k)}(i,j) = \sum_{x=\alpha}^{\beta} \sum_{y=\gamma}^{\delta} s_{t-1}^2(x + i, y + j)$$

* * * * *